(12) United States Patent
Lowe et al.

(10) Patent No.: US 10,949,484 B2
(45) Date of Patent: Mar. 16, 2021

(54) SYSTEMS AND METHODS FOR GRAPHICALLY REPRESENTING RESEARCH RELATIONSHIPS

(71) Applicant: Wellspring Worldwide Inc., Chicago, IL (US)

(72) Inventors: Robert Lowe, Chicago, IL (US); Matthew Hamilton, Chicago, IL (US); William Butler, Mead, CO (US)

(73) Assignee: Wellspring Worldwide Inc., Chicago, IL (US)

(*) Notice: Subject to any disclaimer, the term of this patent is extended or adjusted under 35 U.S.C. 154(b) by 59 days.

(21) Appl. No.: 16/235,680

(22) Filed: Dec. 28, 2018

(65) Prior Publication Data

US 2020/0210509 A1    Jul. 2, 2020

(51) Int. Cl.

| | | |
|---|---|---|
| *G06F 16/9538* | (2019.01) | |
| *G06F 16/26* | (2019.01) | |
| *G06F 16/27* | (2019.01) | |
| *G06F 16/93* | (2019.01) | |
| *G06F 16/9536* | (2019.01) | |
| *G06F 3/0484* | (2013.01) | |
| *G06F 16/28* | (2019.01) | |

(52) U.S. Cl.
CPC .......... *G06F 16/9538* (2019.01); *G06F 16/27* (2019.01); *G06F 16/288* (2019.01); *G06F 16/93* (2019.01); *G06F 16/9536* (2019.01); *G06F 3/0484* (2013.01)

(58) Field of Classification Search
CPC ...... G06F 16/9538; G06F 16/27; G06F 16/93; G06F 16/288; G06F 16/9536; G06F 3/0484
USPC ......................................................... 707/722
See application file for complete search history.

(56) References Cited

U.S. PATENT DOCUMENTS

2006/0106847 A1* 5/2006 Eckardt, III ........ G06F 16/3323
2018/0232428 A1* 8/2018 Fleming .................. G06F 3/017

* cited by examiner

*Primary Examiner* — Evan Aspinwall
(74) *Attorney, Agent, or Firm* — Foley & Lardner LLP

(57) ABSTRACT

Systems and methods for graphically representing a research relationship. A user operating a user device provides a search input for a target entity. An input detector receives the search input. A database searcher retrieves publications associated with the target entity from a plurality of databases, at least some of which being jointly contributed to by the target entity and associated entities. A publication compiler determines a number of publications for the target entity and a number of publications for the associated entities. A user interface generator generates a GUI representing a research relationship between the target entity and the associated entities. The target entity and the associated entities are represented as objects having a size corresponding to the number of publications, with the objects connected via connectors which represent joint contribution to one or more of the plurality of publications by the target entity and a respective associated entity.

20 Claims, 6 Drawing Sheets

SYSTEMS AND METHODS FOR GRAPHICALLY REPRESENTING RESEARCH RELATIONSHIPS

TECHNICAL FIELD

The present disclosure relates generally to graphical user interfaces. More specifically, the present disclosure relates to systems and methods for graphically representing research relationships on a graphical user interface.

Many entities, including individuals, enterprises, universities, etc., engage in joint research. Often times, these entities engage in such research pursuant to a contractual agreement. Such research may result in bringing a product to market. For instance, some universities may engage in joint research with pharmaceutical companies to develop treatments or pharmaceuticals for fighting various diseases. As another example, automotive companies and universities may engage in joint research to develop autonomous vehicles.

Companies and universities may seek information pertaining to joint research to target specific enterprises for investment, partnerships, and licensing. Such research may be cumbersome because it may be difficult to search through multiple databases and platforms for identifying publications which are jointly published.

SUMMARY

At least one embodiment relates to a system for graphically representing a research relationship. The system includes communications device communicably coupled to a plurality of databases, which store publications, and a user device. The system includes a processing circuit including a processor and memory. The memory stores instructions that, when executed by the processor, cause the processor to receive, from the user device, a search input for a target entity. The memory further stores instructions to retrieve, via the communications device from the plurality of databases, a plurality of publications which are associated with the target entity. At least some of the plurality of publications were contributed to by associated entities. The memory further stores instructions to determine a number of publications for the target entity. The memory further stores instructions to determine a number of publications for each of the associated entities. The memory further stores instructions to generate a graphical user interface which represents a research relationship between the target entity and each of the associated entities. The target entity and each of the associated entities are represented on the graphical user interface by an object having a size corresponding to the number of publications. The object for the target entity is connected to the objects for the associated entities by connectors which represent joint contribution to one or more of the plurality of publications by the target entity and a respective associated entity.

Another embodiment relates to a method for graphically representing a research relationship. The method includes receiving, from a user device, a search input for a target entity. The method includes retrieving, via a communications device from a plurality of databases which store publications associated with various entities, a plurality of publications which are associated with the target entity. At least some of the plurality of publications were contributed to by associated entities. The method includes determining a number of publications for the target entity. The method includes determining a number of publications for each of the associated entities. The method includes generating a graphical user interface which represents a research relationship between the target entity and each of the associated entities. The target entity and each of the associated entities are each represented on the graphical user interface by an object having a size corresponding to the number of publications. The object for the target entity is connected to the objects for the associated entities by connectors which represent joint contribution to one or more of the plurality of publications by the target entity and a respective associated entity.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Referring generally to the figures, depicted are systems and methods for graphically representing a research relationship. A user operating a user device provides a search input for a target entity. The target entity is an entity which the user requests information pertaining to research relationships. An input detector receives the search input. A database searcher retrieves publications which were published by the target entity from a plurality of databases. At least some of the publications retrieved from the databases may be jointly contributed to by the target entity and associated entities. A publication compiler may determine a number of publications for the target entity. The publication compiler may also determine a number of publications for each of the associated entities. A user interface generator may generate a graphical user interface which represents a research relationship between the target entity and each of the associated entities. The user interface generator may represent the target entity and each of the associated entities as an object having a size corresponding to the number of publications. The user interface generator may connect the object for the target entity and the objects for the associated entities with connectors representing joint contribution on one or more publications.

The embodiments described herein provide an effective user interface for displaying research relationships. The embodiments described herein provide an intuitive user interface which more clearly depicts research relationships. The embodiments described herein modify various aspects of the objects (and, in some embodiments, connectors) for the user interface according the number of publications. The embodiments described herein depict research relationships between entities in an intuitive manner by depicting the entities as objects having a size corresponding to a total number of publications published by that entity and connecting the entities with connectors representing collaboration on publication(s). Various other benefits and improvements will become apparent in the following description.

Before turning to the figures, which illustrate certain exemplary embodiments in detail, it should be understood that the present disclosure is not limited to the details or methodology set forth in the description or illustrated in the figures. It should also be understood that the terminology used herein is for purposes of description only and should not be regarded as limiting.

Figure 1:
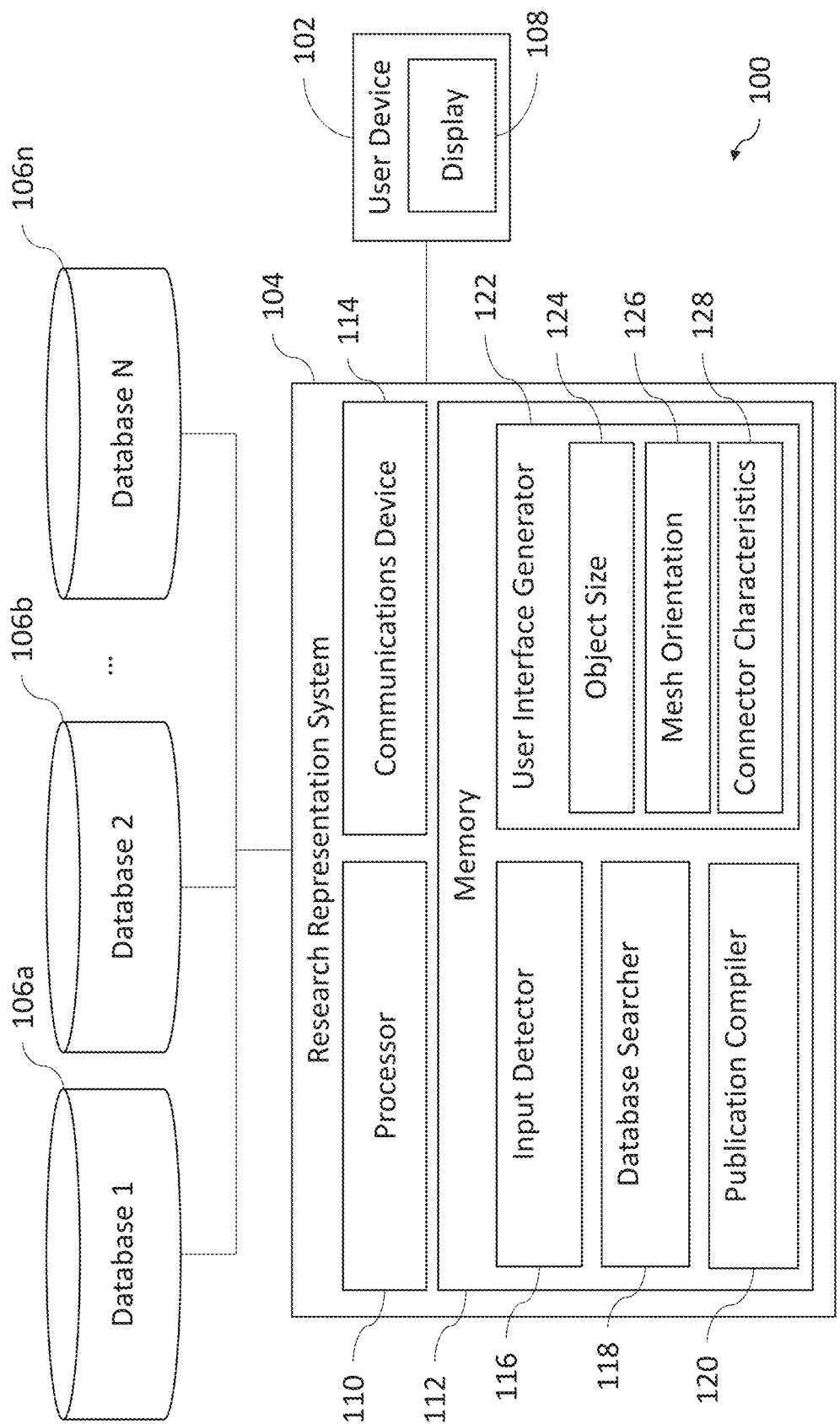
FIG. 1 is a system for graphically representing research relationships.

Referring to FIG. 1, depicted is a system 100 for graphically representing research relationships. The system 100 is shown to include a user device 102, a research representation system 104, and a plurality of databases 106a-106n. The user device 102 may be or include a mobile device (such as a smartphone), a computer (such as a desktop, laptop, etc.), a tablet, and so forth. The user device 102 may be maintained and operated by a user. The research representation system 104 may be or include any device or component (or groups of devices or components) designed or implemented to retrieve information pertaining to research conducted by various entities (e.g., as requested by a user on their user device 102). The research representation system 104 is configured to retrieve such information from the databases 106a-106n. The research representation system 104 is further configured to generate various user interfaces which represent research relationships between a target entity (requested by the user) and associated entities. The user interface adapts in accordance with the research relationship, as described in greater detail below.

The research representation system 104 is shown to include a processor 110, memory 112, and communications device 114. The processor 110 may be embodied as a general-purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor or any conventional processor, controller, microcontroller, or state machine. The processor 110 also may be implemented as a combination of computing devices, such as a combination of a DSP and a microprocessor, a plurality of microprocessors, one or more microprocessors in conjunction with a DSP core, or any other such configuration.

In some embodiments, particular processes and methods may be performed by circuitry that is specific to a given function. The memory 112 (e.g., memory, memory unit, storage device) may include one or more devices (e.g., RAM, ROM, Flash memory, hard disk storage) for storing data and/or computer code for completing or facilitating the various processes, layers, and modules described in the present disclosure. The memory 112 may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes or functions described herein.

The memory 112 is shown to include various elements. These elements may be embodied as circuits, modules, executable instructions, etc. The memory 112 may include an input detector 116, a database searcher 118, a publication compiler 120, and a user interface generator 122. Each of these elements may be configured to execute or perform (or include instructions for executing or performing) various functions associated with the research representation system 104. In some implementations, some of these elements may be combined to form a single element. Further, some elements may be divided into several elements or sub-elements.

In some embodiments, the research representation system 104 is communicably coupled to the user device 102 and database 106a-106n. The research representation 104 may be communicably coupled to the user device 102 and databases 106a-106n via a network. The network may be a Local Area Network (LAN), Wide Area Network (WAN), cloud or internet-based network, etc. The communications device 114 may be or include any device(s) or component(s) designed or configured to facilitate communication across or through the network. The communications device 114 may be, for instance, a cable modem, a cellular device, Wi-Fi or Bluetooth device, etc. The components and elements described herein may each communicate with one another via respective communications devices 114. For instance, each of the databases 106a-106n, research representation system 104, and user device 102 may include a communications device 114 which acts as an interface, entry point, or other facilitator for network communication.

The database(s) 106a-106n are configured to store various publications and corresponding information. Each of the database(s) 106a-106n may be or include one or more servers, for instance. The database(s) 106a-106n may store, maintain, or otherwise include publications. The publications may include, for instance, technical papers, patents and patent application publications, Security Exchange Commission (SEC) documents and filings, research agreements or grants, clinical trial documents, and so forth. Some of these database(s) 106a-106n may be located in different locations or maintained by different entities. For instance, a database 106 including patents and patent application publications may be maintained by a government patent office or patent searching entity, whereas a database 106 including SEC documents and filings may be maintained by the SEC. A database 106 including technical papers may be maintained by a publisher (such as the Journal of the American Medical Association, Nano Letters, the Journal of Cheminformatics, the Journal of Anesthesiology, Institute of Electrical and Electronic Engineers (IEEE), etc.). The databases 106a-106n may store a copy of each publication and bibliographic information (e.g., publication date, authors/filers, entities associated with the publication, etc.). As new publications are published (e.g., with a new issuance or release of a journal, issued patents or published patent applications, etc.), the databases 106a-106n may correspondingly be updated. As such, the publications maintained within the databases 106a-106n may be updated with newly published publications.

Generally speaking, a user can access the research representation system 104 via the user device 102. The user can request information pertaining to a target entity. The research representation system 104 identifies the input from the user (e.g., the target entity), retrieves information corresponding to the target entity from the database(s) 106a-106n, and generates a user interface which represents the information to the user.

While the research representation system 104 is described herein as embodied as a website, the research representation system 104 may be embodied as an application, service, program, software, or other user-accessible system. The user accesses the website by providing a Uniform Resource Locator (URL) associated with the webpage on their user device 102 (e.g., on a browser for their user device 102). Upon entering the URL associated with the research representation system 104, an input user interface (of FIG. 2) is rendered at the user device 102 (e.g., on a display 108 for the user device 102). In some embodiments, when the user enters the URL for the research representation system 104, the user may be prompted to provide log-in credentials, to create a new user profile, etc. The user may provide log-in credentials to a log-in user interface, and may access the input user interface following successful log-in.

Figure 2:
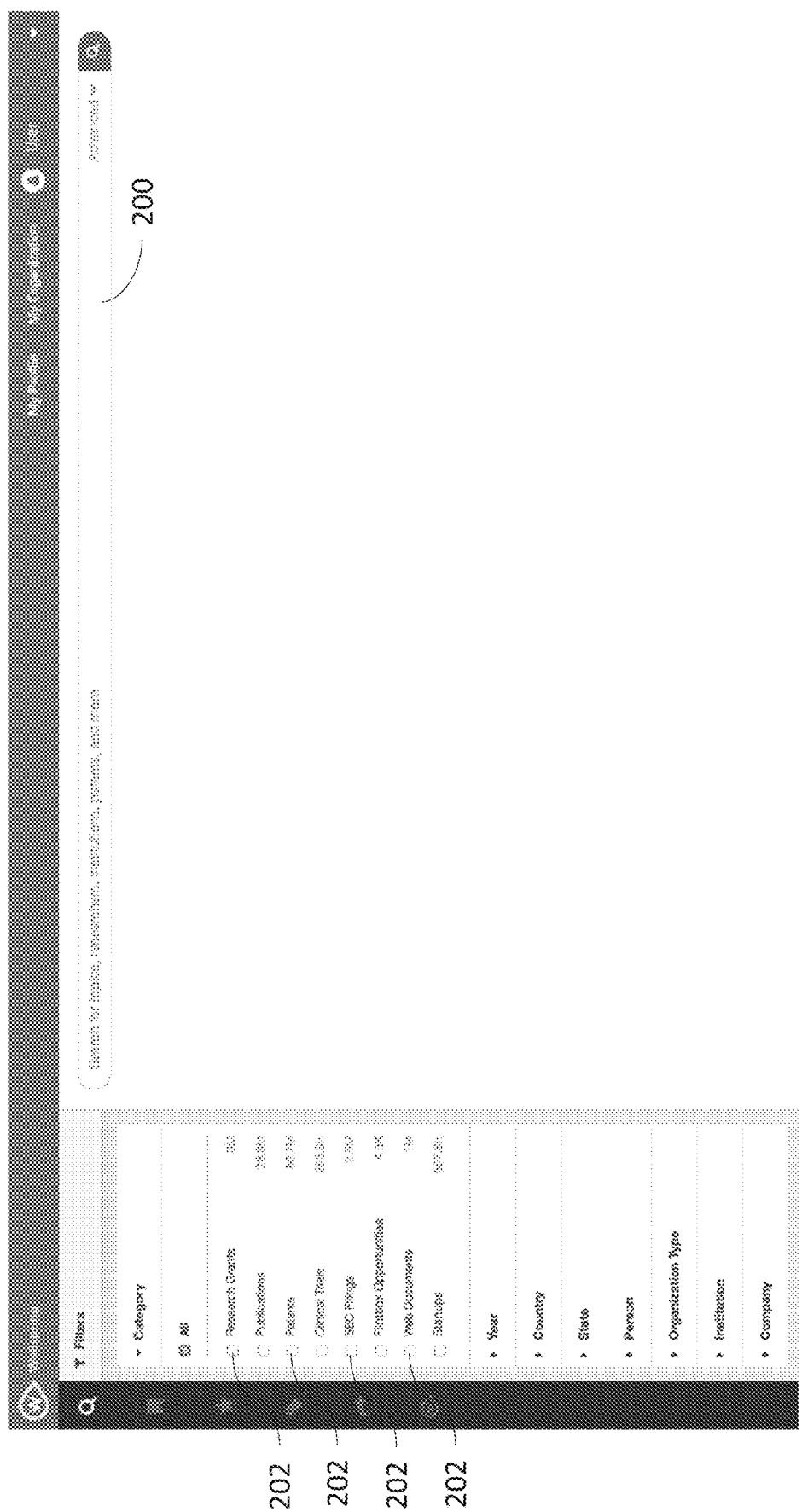
FIG. 2 is an embodiment of an input user interface for a research relationship system.

Referring now to FIG. 1 and FIG. 2, the input detector 116 is configured to receive an input from a user. Specifically, FIG. 2 depicts one embodiment of an input user interface for the research representation system 104. The input detector 116 is configured to receive inputs from the user device 102 via the communications device 114. As a user interacts with various user interface elements and objects (such as drop-down menus, search boxes, selection boxes, filter buttons, etc.), the user device 102 may generate inputs which are communicated from the user device 102 to the research representation system across a network. For instance, the user may provide a search input to a search box 200 on the input user interface and may select narrowing filters through selection boxes 202 on the user interface.

The communications device 114 is configured to receive the inputs (such as search inputs) received from the user device 102. The input detector 116 may be configured to extract a search string from an input received from the user. In other embodiments, the user device 102 may be configured to communicate the search string as an input to the research representation system 104. In each of these embodiments, the research representation system 104 is configured to receive a search input from a user device 102. The search input may be a search string itself, or an input corresponding to the search string. The input detector 116 may be configured to identify the search string within the search input. The search string may request information pertaining to a target entity. "Target entity," as used herein, refers to a specific entity which a user requests pertinent information pertaining to. Hence, a target entity is generally a subject of a query, search, etc. The target entity may be an enterprise, such as university, a corporation, a non-profit organization, a research institute, an individual, such as individual researchers, professors, inventors, etc. In some embodiments, the target entity may be a research topic, such as cancer, autonomous driving, global warming, etc.

The database searcher 118 is configured to extract, request, receive, or otherwise retrieve publications from the database(s) 106a-106n. In some embodiments, the database searcher 118 generates a search query for each database. The search query may be structured to search for the target entity requested by the user. In some embodiments, the database searcher 118 may search the bibliographic data for the target entity. For instance, where the target entity is an individual named "John Doe," the database searcher 118 may be configured to search for authors/inventors named John Doe and enterprises named John Doe. As another example, where the target entity is an enterprise "General Hospital," the database searcher 118 may search for authors/inventors affiliated with General Hospital, assignees named General Hospital, etc. In this regard, the database may generate a search query for each of the databases 106a-106n which requests publications published by the target entity.

In some embodiments, the user may narrow search results. For instance, the user may be interested in patent-related publications (e.g., patents and patent application publications) for the target entity. The user may select the selection box 202 for patents and may input a name of the target entity in the search box 200. The database searcher 118 may combine the search inputs (e.g., the name of the target entity and the selection of the selection box 202 for patents) and may generate a search query for the databases 106a-106n. In some embodiments, the database searcher 118 may provide the search query to specific databases 106a-106n (such as those which maintain patent-related publications, continuing the previous example). Hence, in some embodiments, the database searcher 118 uses the filtering from the user (based on selections of the selection boxes 202) to select which databases to provide the search query.

The database(s) 106a-106n is configured to return results based on the search query from the database searcher 118. In some embodiments, the database(s) 106a-106n return the actual publications which fit within or satisfy the search query. In other embodiments, the database(s) 106a-106n return a list of publications which fit within or satisfy the search query.

The publication compiler 120 is configured to collect, organize, categorize, or otherwise compile publications received from the database(s) 106a-106n responsive to the search query provided by the database searcher 118 to the database(s) 106a-106n. The publication compiler 120 may be configured to sort the publications. The publication compiler 120 may be configured to sort the publications based on which entity published, authored, invented, or otherwise contributed to the publication.

The publication compiler 120 is configured to determine a number of publications for each entity which contributed to the publication. For instance, the publication compiler 120 may be configured to determine a number of publications for the target entity, and a number of publications for associated entities which contributed jointly with the target entity. "Associated entity," as used herein (and variants thereof), refers to entities which have contributed, either by way of co-authorship, co-inventorship, joint research, or other form of contribution, to a publication with the target entity. In some embodiments, an associated entity may contribute to a publication with the target entity and another associated entity. Hence, three (or, in some embodiments, more than three) entities may have contributed to a publication. The publication compiler 120 is configured to determine the number of publications for each of the target and associated entities by counting the number of publications for each entity. The publication compiler 120 may be configured to count the number of publications following sorting of the publications from the databases 106a-106n by entity.

Figure 3:
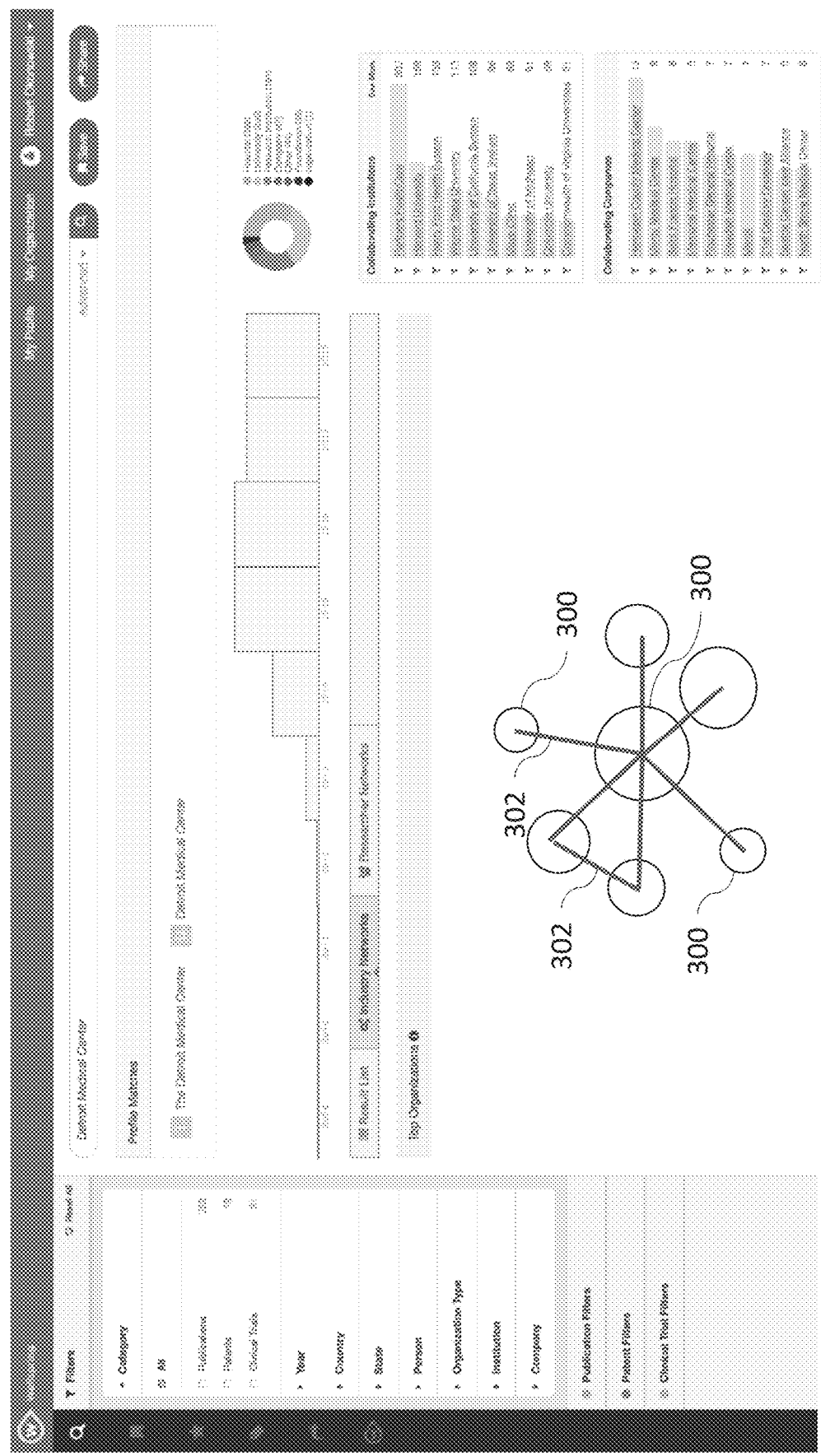
FIG. 3 is one embodiment of a user interface for representing research relationships between several entities.
Figure 4:
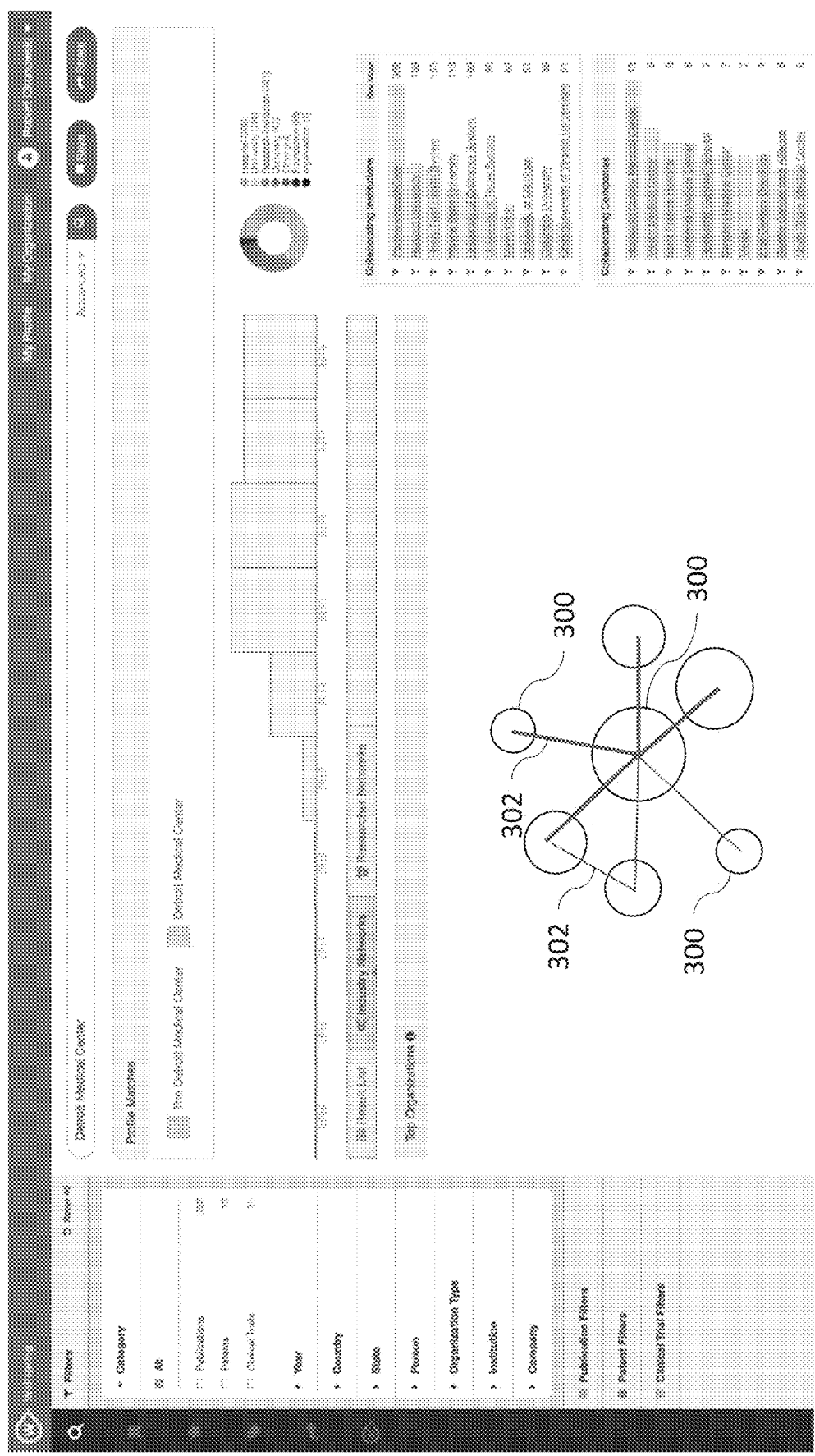
FIG. 4 is another embodiment of a user interface for representing research relationship between several entities.
Figure 5:
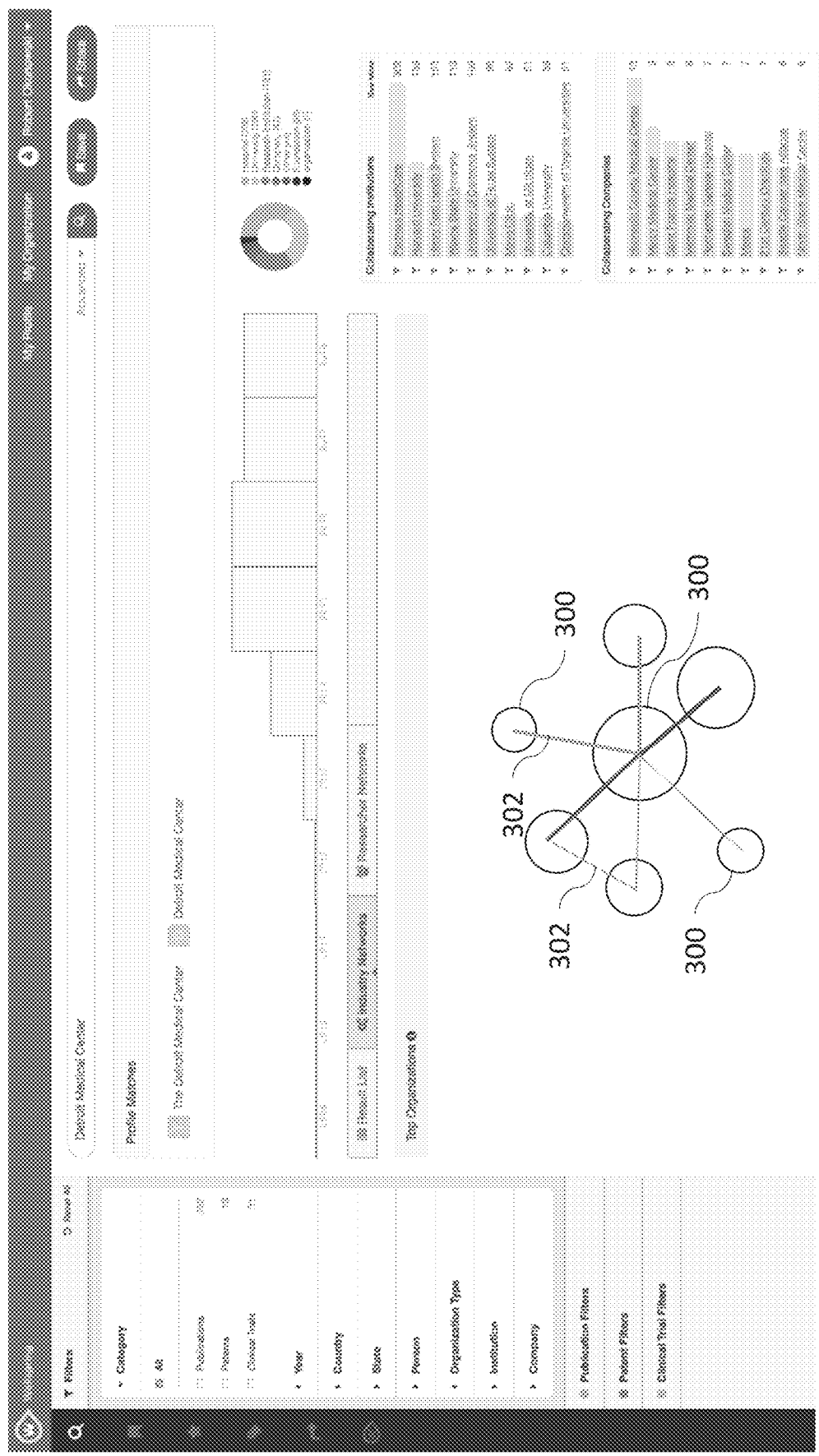
FIG. 5 is another embodiment of a user interface for representing research relationships between several entities.
Figure 6:
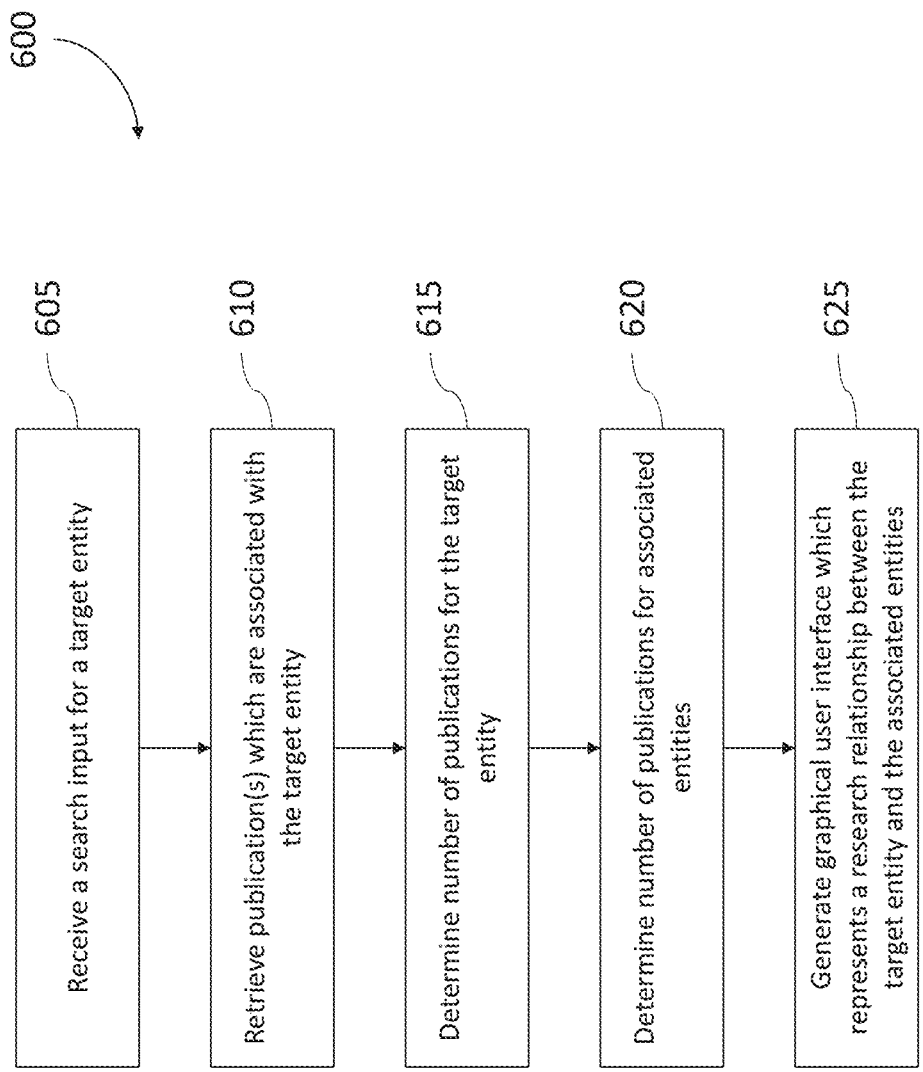
FIG. 6 is a flowchart showing an embodiment of a method for graphically representing a research relationship.

Referring now to FIG. 1 and FIGS. 3-5, the user interface generator 122 is configured to generate a user interface which represents the research relationship between the target entity and associated entities. Specifically, FIG. 3-FIG. 5 show various embodiments of user interfaces for representing research relationships between several entities. The user interface generator 122 is configured to select an object size 124, a mesh orientation 126, and a connector weight 128. The user interface generator 122 is configured to select the object size 124, the mesh orientation 126, and/or the connector weight 128 based on the compiled publications for each entity. The objects 300 may be associated with the target entity and associated entities, and the connectors 302 may show or represent research relationships between the target entity and associated entities.

In some embodiments, the user interface generator 120 may be configured to selectively include or exclude objects 300 (or corresponding entities) from the mesh. For instance, where a given request returns a number of entities beyond a threshold number (for instance, 50 entities, 100 entities, and so forth), the user interface generator 122 may be configured to limit the number of objects on the user interface. The user interface generator 122 may be configured to filter the entities by the number of publications. In some embodiments, the user interface generator 120 may be configured to identify the entities having the highest number of publications (e.g., top 50, top 100 entities, etc.). The user interface generator may be configured to generate a mesh which includes the entities having the highest number of publications. As such, the mesh may represent a portion of entities from the request.

The objects 300 are shown to be circles. However, in some embodiments, the objects 300 may take different forms. For instance, the objects 300 may be squares, diamonds, hexagons, or any other shapes. The user interface generator 122 may be configured to select a size of the objects 300. The user interface generator 122 may select an object for each of the entities (e.g., the target entity and associated entities). The user interface generator 122 may determine a size for each of the objects based on the determined number of publications for each of the entities. The user interface generator 122 may select the size based on the proportion of the number of publications for an entity relative to each of the other entities. For instance, as the relative number of publications for an entity increases, the size of the object 300 may correspondingly increase. Where the objects 300 are circles, a diameter for the circles may increase in proportion with the number of publications.

In some embodiments, where each entity has a similar number of publications, each corresponding object may have the same or similar size. The user interface generator 122 may determine the size of the object based on the total number of publications for an entity (e.g., without regard to other entities). For instance, the size of the object 300 may increase in proportion to the number of publications. As can be seen in FIG. 3-FIG. 5, the objects 300 have different sizes which change in proportion to the number of publications. As the number of publications for a respective object 300 increases, the object's 300 size may correspondingly increase.

The user interface generator 122 may be configured to select a mesh orientation 126. The mesh orientation 126 may be defined as the orientation of one object to another object. The mesh may include two or more objects 300 which are connected by a connector 302. The user interface generator 122 may be configured to select the mesh orientation 126 such that the largest objects 300 are located towards the center or middle of the mesh, and objects of decreasing size are located outwardly from the center of the mesh. In this regard, entities having the most publications have corresponding objects which are located towards the center of the mesh.

The user interface generator 122 may be configured to define connectors 302 between the objects. Since each object represents an entity (e.g., either a target entity or an associated entity), the connectors 302 may define, represent, or map joint contribution to one or more publications between two entities.

In some embodiments, the user interface generator 122 is configured to select connector characteristics 128 based on the number of publications. Connector characteristics 128 may include, for instance, connector weight (or thickness), connector opacity, etc. In embodiments where the connectors are colored, the connector characteristics may include color. The user interface generator 122 may be configured to select connector characteristics 128 based on the number of publications contributed by two or more entities as determined by the publication compiler 120. For instance, where two entities jointly contribute on publication(s), the user interface generator 122 may change the connector characteristics 128 for the connector which connects objects corresponding to those two entities with the number of publications jointly contributed by those two entities. For instance, the user interface generator 122 may increase the weight of the connectors 302 as the number of publications jointly contributed by the two entities increases (as shown in FIG. 4 and FIG. 5). As another example, the user interface generator 122 may increase the opacity as the number of publications jointly contributed by the two entities increases (as shown in FIG. 5).

Following generation of the user interface, the user interface generator 122 may be configured to communicate the generated user interface to the user device 102. The user interface generator 122 may generate instructions for assembling the user interface and communicate those instructions to the user device 102 using the communications device 114. The user device 102 may receive the instructions and assemble the user interface for displaying (e.g., on the display 108).

In each of these embodiments, a user may quickly and efficiently identify a research relationship between two or more entities. Additionally, a user may quickly identify a publication profile for a target entity. Such embodiments may present a user-friendly interface by correlating the size of the objects of the user interface with number of publications for a corresponding entity, and by representing entities having collaborated on publications between two or more entities. A user can intuitively understand research relationships between two or more entities based on the size of the objects and collaboration based on existence or presence of connectors between the objects.

Now that various aspects of the system 100 have been disclosed, a method for graphically representing a research relationship will be described. The following method is only one embodiment of a method of graphically representing a research relationship. Various operations and processes are described with reference to the following method. However, the present disclosure is not limited to the following operations and steps. To the contrary, various steps and operations may be omitted, modified, and additional steps may be included in the method. Some steps and operations may be performed at the same time.

At 605, the research representation system 104 receives a search input for a target entity. In some embodiments, the research representation system 104 receives the search input for a target entity from a user device. A user who owns, maintains, or otherwise operates the user device may select an icon for the research representation system 104, a URL for the research representation system 104, etc. The user may launch an input user interface (such as the user interface depicted in FIG. 2). The user interface may receive search inputs from the user. The search inputs may include search queries corresponding to the target entity which may be provided by the user via a search box (e.g., similar to search box 200), or filters which are provided by the user via selection boxes (e.g., similar to selection boxes 202).

The input detector 116 of the research representation system 104 may receive the search input provided by the user. The user device 102 may communicate the search input from the user device 102 to the research representation system 104 across a network. The communications device 114 may receive the search input from the user device 102. The input detector 116 may receive the search input via the communications device 114.

The input detector 116 may identify a search string based on the search input. The search string may be the same as or different from the search input. In some embodiments, the search input is a group of search inputs (e.g., text provided to a search box 200 and a filter provided to a selection box). In such embodiments, the search string may be a compilation of the search inputs. The input detector may identify the target entity and may identify any filters applied by the user for the search. In some embodiments, the target entity may include an enterprise, an individual, and/or a research topic. The enterprise may include a university, a corporation, a non-profit organization, and a research institute. The individual may include an inventor, a researcher, and a professor.

At 610, the research representation system 104 retrieves a plurality of publications which are associated with the target entity. At least some of the publications may be contributed to by associated entities. Associated entities may be or include any entity which contributed to (e.g., by co-authoring, co-inventing, co-publishing, etc.) a publication. The research representation system 104 may retrieve the publications using a communications device from a plurality of databases 106 which store publications associated with various entities. Each publication retrieved by the research representation system 104 may be affiliated in some way with the target entity. At least some of the publications may also be affiliated with other associated entities.

Each of the databases 106 may store publications associated with various entities. The publications may include, for instance, technical papers, patents and patent application publications, SEC documents and filings, research agreements or grants, clinical trial documents, etc. The databases may be maintained by different enterprises. For instance, the database which stores patents and patent application publications may be maintained by a government patent office, a patent searching service, etc. The databases which store SEC documents and filings may be maintained by the SEC.

The database searcher 118 may generate a request for publications. The request may be the same as or similar to the search query identified by the input detector 116. The request may request publications associated with the target entity. In embodiments where the search input from the user included one or more filters, the request may narrow the publications in accordance with the filters (e.g., within a date range, limited to certain types of publications, etc.). The database searcher 118 may communicate (e.g., using the communications device 114) the request to the database(s) 106. In some embodiments, where a filter is applied which requests certain types of publications, the database searcher 118 may communicate the request to specific database(s) 106. For instance, where the search input requests only publications related to patents (e.g., patents and patent application publications), the database searcher 118 may communicate the request to database(s) 106 which store publications related to patents. The database(s) 106 may cross-reference the stored publications with the request and may compile and communicate publications (or a list of publications rather than the actual publications) to the research representation system 104. The research representation system 104 may thus receive the publications from the database(s) 106.

At 615 and 620, the research representation system 104 determines a number of publications for the target entity and associated entities. The publication compiler 120 may identify the publications (or list of publications) received from the database(s) 106. The publication compiler 120 may specifically identify bibliographic information associated with the publications. For instance, the publication compiler 120 may identify the publisher(s), the author(s), the inventor(s), the assignee(s), etc. The publication compiler 120 may sort, iteratively filter, etc. the publications received from the database(s) based on entity. For instance, the publication compiler 120 may maintain a list of each of the entities associated with each of the publications received from the database(s) 106. The publication compiler 120 may determine the number of publications for each of the entities. In embodiments where multiple entities contributed to a publication, each of the entities may be flagged by the publication compiler 120. For instance, a given publication may be jointly contributed to by the target entity and a first and second associated entity. The publication compiler 120 may identify such publications while counting the number of publications for each of the entities (e.g., the target entity and the associated entities).

At 625, the research representation system 104 generates a graphical user interface which represents a research relationship between the target entity and the associated entities. The target entity and each of the associated entities may be represented on the graphical user interface as objects having a size corresponding to the number of publications for each of the respective entities. For instance, the target entity may be represented as an object having a size which increases with the number of publications. The size of the object may increase based on the relative number of publications, or the size of the object may increase based on the number of publications without regard to the total number of publications of other entities.

In some embodiments, the object may be a circle having a diameter which changes with the number of publications. For instance, as the target and associated entities contribute to more publications, the diameter of their representative objects may correspondingly increase. Such embodiments may intuitively represent the number of publications published, authored, invented, or otherwise contributed to by a given entity.

The objects may be interconnected via connectors to form a research mesh. Hence, each object, which represents a given entity, may be connected to other objects showing joint contribution to one or more publications. Hence, the object for the target entity may be connected to the objects for the associated entities by connectors which represent joint contribution to one or more of the plurality of publications (e.g., retrieved at step 620). In some embodiments, user interface generator 122 may configure the orientation of the mesh based on the number of publications for each entity. For instance, the user interface generator 122 may position objects for entities having the greatest number of publications towards the middle or center of the mesh, with other objects moving radially outward as the number of publications decreases. Hence, entities having contributed to the least number of publications may be represented in the outer portion of the mesh, and entities having contributed to the greatest number of publications may be represented in the inner portion of the mesh.

In some embodiments, various aspects and characteristics of the connectors may be selected, modified, adapted, or otherwise changed based on the number of joint publications between the target entities and associated entities. For instance, the user interface generator 122 may change the weight of the connectors, the opacity of the connectors, the color of the connectors, etc. As one example, the user interface generator 122 may increase the weight of the connectors between an object for the target entity and an object for a first associated entity as the number of publications which were jointly contributed to by the target and first associated entity increases. As another example, the user interface generator 122 may increase the opacity of the connectors between an object for the target entity and an object for a first associated entity as the number of publications which were jointly contributed to by the target and first associated entity increases. As still another example, the user interface generator 122 may increase both the opacity and the weight of the connectors between an object for the target entity and an object for a first associated entity as the number of publications which were jointly contributed to by the target and first associated entity increases.

In some embodiments, the target entity may jointly contribute to a publication with a first associated entity and a second associated entity. In such embodiments, the user interface generator 122 may represent the target entity and first and second associated entities as respective objects. The object for the target entity may be connected to both objects for the first and second associated entities via respective connectors. Additionally, the object for the first associated entity may be connected to the object for the second associated entity via a respective connector.

In embodiments where the user interface generator 122 changes characteristics of the connectors according to the number of publications, each of the respective connectors between the objects for the target entity, first associated entity, and second associated entity may be different. For instance, the first connector connecting the target entity and first associated entity, the second connector connecting the target entity and second associated entity, and the third connector connecting the first and second associated entities may each have different weights. The first connector may have a weight corresponding to a number of publications contributed to by the target entity and the first associated entity. Similarly, the second connector may have a weight corresponding to a number of publications contributed to by the target entity and second associated entity. The third connector may have a weight corresponding to a number of publications contributed to by each of the target entity, the first associated entity, and second associated entity.

In some embodiments, the method 600 further includes communicating data corresponding to the graphical user interface to the user device 102 for rendering the graphical user interface to a user. The research representation system 104 may communicate instructions for generating the graphical user interface to the user device 102. In some embodiments, the research representation system 104 may communicate a Document Object Model (DOM) for the graphical user interface. The research representation system 104 may generally cause the graphical user interface to be rendered to a user of the user device. The user device 102 may receive the data from the research representation system 104. The user device 102 may construct the user interface, and render the user interface (e.g., on a display 108 for the user device 102).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled," and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to or depictions of the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods as shown in the various exemplary embodiments are illustrative only. Additionally, any element disclosed in one embodiment may be incorporated or utilized with any other embodiment disclosed herein. For example, the changing opacity of the connectors of the exemplary embodiment shown in FIG. 5 may be incorporated in the connectors of the exemplary embodiment shown in FIG. 3. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for graphically representing a research relationship, the system comprising:
   a communications device communicably coupled to a plurality of databases, which store publications, and a user device;
   a processing circuit including a processor and memory, the memory storing instructions that, when executed by the processor, cause the processor to:
      receive, from the user device, a search input for a target entity;
      retrieve, via the communications device from the plurality of databases, a plurality of publications which are associated with the target entity, wherein at least some of the plurality of publications were contributed to by associated entities;
      determine a number of publications for the target entity;
      determine a number of publications for each of the associated entities; and
      generate a graphical user interface which represents a research relationship between the target entity and each of the associated entities, wherein generating the graphical user interface comprises:
         representing the target entity as a target object and each of the associated entities as associated objects within a mesh, wherein each of the target object and associated objects have a size which corresponds to the number of publications; and
         generating one or more connectors which connect the target object for the target entity to the associated objects for the associated entities, wherein the connectors represent joint contribution to one or more of the plurality of publications by the target entity and a respective associated entity, and wherein each associated object is located a distance from the target object in the mesh which corresponds to the number of publications jointly contributed to by the respective associated entity and the target entity.

2. The system of claim 1, wherein the memory is further configured to:
   communicate, by the communications device, data corresponding to the graphical user interface to the user device for rendering the graphical user interface to a user.

3. The system of claim 1, wherein the target and associated objects are represented as circles having a diameter which increases in proportion to the number of publications.

4. The system of claim 1, wherein the target object is connected by a first connector to a first associated object corresponding to a first associated entity and a second connector to a second associated object corresponding to a second associated entity, the target entity, the first associated entity, and the second associated entity having jointly contributed to a publication.

5. The system of claim 4, wherein the first and second associated objects are connected by a third connector.

6. The system of claim 5, wherein the first connector, the second connector, and the third connector each have different weights, the first connector having a weight corresponding to a number of publications contributed to by the target entity and the first associated entity, the second connector having a weight corresponding to a number of publications contributed to by the target entity and second associated entity, and the third connector having a weight corresponding to a number of publications contributed to by each of the target entity, the first associated entity, and second associated entity.

7. The system of claim 1, wherein the connector has a weight or an opacity which corresponds to the number of publications contributed to by the target entity and a respective associated entity.

8. The system of claim 1, wherein the publications comprise at least one of technical papers, patents and patent application publications, Security Exchange Commission (SEC) documents and filings, research agreements or grants, and clinical trial documents.

9. The system of claim 1, wherein the target entity comprises one of an enterprise, including a university, a corporation, a non-profit organization, and a research institute, an individual, such as an inventor, a researcher, and a professor, and a research topic.

10. A method for graphically representing a research relationship, the method comprising:
   receiving, from a user device, a search input for a target entity;
   retrieving, via a communications device from a plurality of databases which store publications associated with various entities, a plurality of publications which are associated with the target entity, wherein at least some of the plurality of publications were contributed to by associated entities;

determining a number of publications for the target entity;

determining a number of publications for each of the associated entities; and generating a graphical user interface which represents a research relationship between the target entity and each of the associated entities, wherein generating the graphical user interface comprises:

representing the target entity as a target object and each of the associated entities as associated objects within a mesh, wherein each of the target object and associated objects have a size corresponding to the number of publications; and generating one or more connectors which connect the target object for the target entity to the associated objects for the associated entities, wherein the connectors represent joint contribution to one or more of the plurality of publications by the target entity and a respective associated entity, and wherein each associated object is located a distance from the target object in the mesh which corresponds to the number of publications jointly contributed to by the respective associated entity and the target entity.

11. The method of claim 10, further comprising:

communicating, by the communications device, data corresponding to the graphical user interface to the user device for rendering the graphical user interface to a user.

12. The method of claim 10, wherein the target and associated objects are represented as circles having a diameter which increases in proportion to the number of publications.

13. The method of claim 10, further comprising:

determining, based on the retrieved publications, that a publication was jointly contributed to by the target entity, a first associated entity, and a second associated entity, and wherein the target object is connected by a first connector to a first associated object corresponding to the first associated entity and a second connector to a second associated object corresponding to the second associated entity, the target entity, the first associated entity, and the second associated entity having jointly contributed to a publication.

14. The method of claim 13, wherein the first and second associated objects are connected by a third connector.

15. The method of claim 14, wherein the first connector, the second connector, and the third connector each have different weights, the first connector having a weight corresponding to a number of publications contributed to by the target entity and the first associated entity, the second connector having a weight corresponding to a number of publications contributed to by the target entity and second associated entity, and the third connector having a weight corresponding to a number of publications contributed to by each of the target entity, the first associated entity, and second associated entity.

16. The method of claim 10, wherein the connector has a weight or an opacity which corresponds to the number of publications contributed to by the target entity and a respective associated entity.

17. The method of claim 10, wherein the publications comprise at least one of technical papers, patents and patent application publications, Security Exchange Commission (SEC) documents and filings, research agreements or grants, or clinical trial documents.

18. The method of claim 10, wherein the target entity comprises one of an enterprise, including a university, a corporation, a non-profit organization, and a research institute, an individual, such as an inventor, a researcher, and a professor, and a research topic.

19. The system of claim 1, wherein the distance between the target object and a respective associated object increases as the number of publications jointly contributed to by the respective associated entity and the target entity decreases.

20. The method of claim 10, wherein the distance between the target object and a respective associated object increases as the number of publications jointly contributed to by the respective associated entity and the target entity decreases.

* * * * *